(12) United States Patent
Petersen et al.

(10) Patent No.: US 6,178,235 B1
(45) Date of Patent: Jan. 23, 2001

(54) DYNAMIC TRAFFIC DISTRIBUTION

(75) Inventors: René Petersen, Valby; Tommy M. Petersen, Albertslund, both of (DK)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 08/766,682

(22) Filed: Dec. 13, 1996

(51) Int. Cl.[7] .......................... H04M 15/60; H04M 7/00; H04L 12/28; H04L 12/56
(52) U.S. Cl. .................. 379/134; 379/113; 379/219; 379/220; 370/414; 370/418; 370/237
(58) Field of Search .................. 379/111, 112, 379/113, 133, 134, 135, 136, 130, 140, 115, 219, 220; 370/230, 231, 232, 233, 234, 235, 237, 413–418

(56) References Cited

U.S. PATENT DOCUMENTS

| | | |
|---|---|---|
| 4,866,763 | 9/1989 | Cooper et al. . |
| 5,042,027 | * 8/1991 | Takase et al. ................. 379/133 |
| 5,086,460 | 2/1992 | Ash et al. . |
| 5,311,585 | 5/1994 | Armstrong et al. . |
| 5,406,620 | 4/1995 | Pei . |
| 5,463,686 | * 10/1995 | Lebourges ..................... 379/219 |
| 5,563,885 | * 10/1996 | Witchey ........................ 370/413 |
| 5,608,790 | * 3/1997 | Ardon .......................... 379/220 |
| 5,629,938 | * 5/1997 | Cerciello ...................... 379/220 |

OTHER PUBLICATIONS

*Patent Abstracts of Japan*, vol. 15, No. 29, (E–1026), Jan. 23, 1991 & JP–02–272860–A (NEC Corp), Nov. 7, 1990.
*Patent Abstracts of Japan*, vol. 15, No. 236 (E–1078), Jun. 18, 1991 & JP 03 070389 A (NEC Corp), Mar. 26, 1991.

* cited by examiner

*Primary Examiner*—Paul Loomis
(74) *Attorney, Agent, or Firm*—Nixon & Vanderhye P.C.

(57) ABSTRACT

Telecommunications traffic is dynamically distributed at a telecommunications node among plural telecommunication routes. A current distribution of traffic is detected for both incoming routes and outgoing routes. Traffic is automatically redistributed among the outgoing routes based on the distribution currently detected for the corresponding incoming routes. More specifically, the detected amount of incoming traffic for a particular network operator, carrier, route bundles, or route is compared with the amount of outgoing traffic detected for a corresponding network operator, carrier, route bundle, or route at the switching point. Traffic is rerouted, in one example embodiment, so that each outgoing network operator, carrier, route bundle, or route receives its "fair" share of traffic based on how much traffic it is currently delivering to the node.

27 Claims, 6 Drawing Sheets

DYNAMIC TRAFFIC DISTRIBUTION

FIELD OF THE INVENTION

The present invention relates to routing of traffic over a communications network, and more particularly, to dynamic distribution of traffic at a switching point.

BACKGROUND AND SUMMARY OF THE INVENTION

In accordance with the International Telecommunication Union E.170 relating to telephone network and ISDN operation, numbering, routing, and mobile service, the objective of telecommunications "routing" is to establish a successful connection between any two exchanges in the telecommunications network. More broadly, the function of traffic routing is the selection of one or more particular circuit groups or routes for a given call attempt to establish a call connection via the network.

A telecommunications network comprises a number of nodes or switching points interconnected by circuit groups. An example of a switching point is a telephone exchange. A telephone subscriber looking into the telecommunications network is served by a local exchange. Within a national network, there is typically a hierarchy of switching centers including for example local, trunk, regional, and international with each level performing different functions. Physical communications media connecting one switching point or exchange with another are often referred to as "trunks," and physical communications media connecting a subscriber to the local exchange that serves the subscriber are often referred to as "lines." There may be several direct connections, e.g., trunks, between a pair of nodes which can be either unidirectional or bi-directional. A circuit group includes all of the direct connections between two nodes. A route is defined as one or more circuit groups providing a connection between switching points or other network nodes.

A routing scheme in the network defines how a set of routes is made available for calls between a pair of nodes. The routing "scheme" may be direct or indirect, fixed or dynamic. A direct route connects two nodes by a single circuit group without any intermediate nodes. An indirect route is a series of circuit groups connecting two nodes provided in end-to-end connection via other nodes. For a fixed routing scheme, the set of routes in the routing, pattern is always the same. In the case of a dynamic routing scheme, the set of routes in the routine pattern varies. The route selected for a specific call may be sequential or non-sequential. In sequential selection, routes in a set are always tested in sequence, and the first available route is selected. For non-sequential selection, the routes are tested in no specific order.

Call control procedures in the network define the entire set of interactive signals necessary to establish, maintain, and release the connection between exchanges. In originating call control, the originating exchange maintains control of the call setup until the connection between the originating and terminating exchanges is completed. Progressive call control uses link-by-link signaling to pass supervisory controls sequentially from one exchange to the next. Call control is "reversible" when that control signaling can be passed "backwards" using automatic rerouting or "crank back" actions. Accordingly, if a congestion signal is received from one downstream exchange subsequent to the seizure of an outgoing circuit from the originating exchange, the call is rerouted at the originating exchange.

Routing schemes generally attempt to share the traffic load among routes. Traffic is defined generally as a process of events related to demands to use resources in a telecommunications network. The most commonly recognized traffic example is telephone calls. More specifically, routing schemes may be developed to ensure that call attempts are offered to certain preselected routes according to a preplanned distribution. Consider for example an incoming traffic stream to a switching point or node having a particular destination, e.g., the same area code. The switching node might have four outgoing routing patterns A, B, C, and D to that particular destination with each routing pattern including one or more routing options. In accordance with the preplanned distribution, each routing pattern may be preset to receive a certain ratio or percentage of the total number of outgoing calls.

However, distributing call attempts to a particular destination in a fixed ratio between the specified outgoing routing pattern can be problematic. Consider for example the situation where a country or other geographic region is served by more than one telecommunications carrier or network operator. Each outside carrier that supplies traffic to that country or region desires that other carriers inside that country or region return to it a "fair" amount of traffic. One example definition of "fair" is each carrier receives as outgoing traffic from the node substantially the same percentage of total node traffic that carrier supplies as incoming traffic to the node.

Even though traffic patterns at a particular switching point often change, fixed load share routing schemes do not account for such changes and therefore generally fail to return fair amounts of traffic. One solution to ameliorate this problem is to orchestrate payments between various carriers to compensate for distribution inequities, but this solution is difficult to monitor and costly to administrate.

A much better solution provided by the present invention is to dynamically distribute traffic in a switching point or node based on the current input traffic pattern at that node. Following the example above, if the four telecommunications operators A, B, C, D are operating in a switching point, the percentage of the total outgoing traffic routed to their respective carrier routes routing patterns A2, B2, C2, and D2 should be approximately the same as the traffic percentage received on corresponding incoming carrier routes A1, B1, C1, and D1.

It is therefore an object of the present invention to achieve dynamic traffic distribution at a switching point or other network node.

It is a further object of the present invention to ensure that different routes, groups of routes, carriers, operators, etc. connected to a switching point or other network node receive a fair share of traffic.

It is a further object of the present invention to minimize the cost and administration required to ensure that such different routes, groups of routes, carriers, operators, etc. receive their fair share of traffic at a particular switching point.

It is a further object of the present invention to provide network operators with a flexible and easy method to define traffic distribution patterns.

The distribution of traffic for incoming carriers to a switching point or other network node and for outgoing carriers from the node may be based on the amount of traffic currently being carried by each network operator/carrier. The amount of traffic may be measured in a variety of different ways such as percentage of total calls per unit time, number of call minutes or seconds over a particular time period or a preset number of calls, etc. Traffic is then redistributed among outgoing carriers based on the traffic distribution detected for corresponding incoming carriers. Such traffic rerouting among the outgoing carriers ensures that each carrier gets its fair share of outgoing traffic from the node based on the amount of traffic it brings to that node.

To implement dynamic traffic distribution at a switching point or other network node, incoming and outgoing traffic controllers detect the amount of traffic coming into and leaving the switching point for each of plural groups of communication routes through the switching point. The incoming traffic controller provides a traffic analyzer with the amount of traffic entering the switching point on each route, group of routes, carrier, etc. and the outgoing traffic controller provides the traffic analyzer with the amount of traffic leaving the switching point on each route, group of routes, carrier, etc.. The traffic analyzer then determines a new output traffic distribution based on the amounts of incoming and outgoing traffic on each route, group of routes, carrier, etc. The traffic analyzer sends a new traffic distribution message to a traffic router, and the traffic router changes the amount of outgoing traffic distributed to each outgoing route. In this way, each outgoing route, group of routes, carrier, etc. may be allocated a fair share of traffic based on the amount of incoming traffic on the corresponding incoming route, group of routes, carrier, etc. Moreover, the difficulties and costs associated with making monetary payments to various operators or carriers as a result of unfair distributions of calls are avoided.

Other features, advantages, and objects of the present invention will be evident from the following detailed description of the invention which provides an example and non-restrictive illustration of how the present invention may be implemented.

DETAILED DESCRIPTION OF THE INVENTION

In the following description, for purposes of explanation and not limitation, specific details are set forth, such as particular hardware components, interfaces, techniques, software functions, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
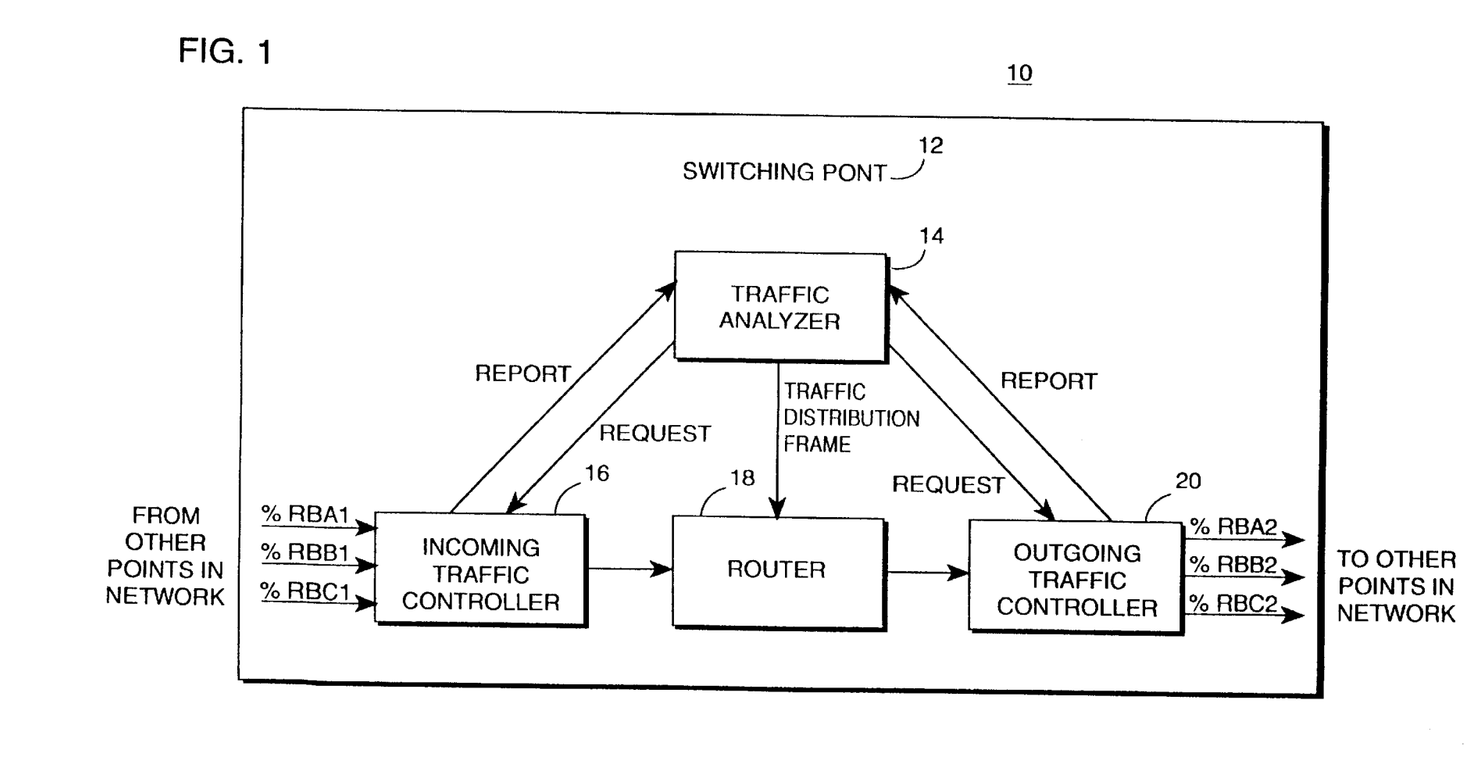
FIG. 1 is a function block diagram of a switching point that employs dynamic traffic distribution in accordance with an example embodiment of the present invention.

FIG. 1 shows an example implementation of the present invention with respect to a switching point 12 that may be a part of a telephony and/or data communications network 10. Switching point 12 may be any network node where communications traffic supported by two or more network operators is routed through that node including for example a national telephone switching exchange, an international switching exchange, a digital cross-connect, etc. The term "route bundle" used hereafter refers to a bundle or group of routes between two points in the network belonging to one network operator. Accordingly, each route bundle includes one or more bi-directional routes through the switching point or node. Sometimes the term "carrier" is used which may include one route, one route bundle, or plural route bundles. Although described in this example in terms of route bundles, the present invention may be applied as well to carriers with plural route bundles as well as individual routes. Typically a network operator owns one or more carriers connected to a switching point, and there may be plural network operators operating at one switching point. FIG. 1 shows three route bundles (RB) labelled as RBA, RBB, and RBC that originate from other points in the network 10 and are ultimately routed to other points in communications network 10.

Switching point 12 includes a traffic analyzer 14 connected to an incoming traffic controller 16, a router 18, and an outgoing traffic controller 20. Incoming traffic controller 16 receives traffic over three incoming route bundles RBA1, RBB1, and RBC1. Assume in the example that route bundle RBA1 currently handles 50% of the incoming traffic to switching point 12, route bundle RBB1 25%, and route bundle RBC1 the remaining 25%. Incoming traffic controller 16 monitors the amount of traffic coming into switching point 12 on each route bundle. While the amount of traffic may be ultimately represented as a percentage of the total amount of traffic, the amount of traffic may initially be measured using established monitoring techniques, i.e., counting, and traffic may be detected/measured based on number of call disconnects, call duration, number of call connections, number of seizure attempts, number of congested calls, number of individuals in a route, number of failed calls to a certain destination, accounting for the calls, etc. Call duration for completed calls (i.e., calls that have been disconnected) is the preferred traffic measurement parameter because call duration is both an accurate measurement of traffic load on routes as well as an important parameter used in charging calculations. Number of calls may be used but some routes may carry a disproportionate amount of short or long duration calls which may then result in unfair sharing of traffic load and unbalanced payments.

Periodically, traffic analyzer 14 sends a request message to the incoming traffic controller for a report on the incoming traffic load distribution. The incoming traffic controller 16 generates a report message that reflects the current amounts of incoming traffic distributed amongst the route bundles RBA1, RBB1, and RBC1.

Similarly, the outgoing traffic controller 20 detects the amount of traffic being routed out of switching point 12 on route bundles RBA2, RBB2, and RBC2 which correspond to RBA1, RBB1, and RBC1, respectively. In response to a request message from traffic analyzer 14, the outgoing traffic controller 20 responds with a report message providing traffic analyzer 14 with the current amounts of outgoing traffic currently allocated to each outgoing route bundle RBA2, RBB2, and RBC2.

The traffic analyzer 14 calculates the difference between the amount of incoming and outgoing traffic distributed for each route bundle (or individual route). When a calculated difference exceeds a threshold, the traffic is redistributed. The traffic analyzer 14 sends a new traffic distribution frame message to the router 18 which then adjusts the distribution of outgoing traffic amongst route bundles RBA2, RBB2, and RBC2 using conventional routing techniques.

Assume the incoming route bundles RBA1, RBB1, and RBC1 are handling 50%, 25%, and 25%, of the incoming traffic, respectively, and route bundles RBA2, RBB2, and RBC2 are handling 40%, 40%, and 20% of the outgoing traffic, respectively. The traffic distribution frame message generated by the traffic analyzer 14 instructs the router 18 to make appropriate routing changes so that significant traffic is directed away from route bundle RBB2 primarily to route bundle RBA2 and then secondarily to route bundle RBC2 to hopefully achieve equity, i.e., route bundle RBA2 receives 50% of the outgoing traffic, RBB2 25% of the outgoing traffic, and RBC2 25% of the outgoing traffic in accordance with the respective amounts of traffic carried on corresponding incoming route bundles.

Figure 2:
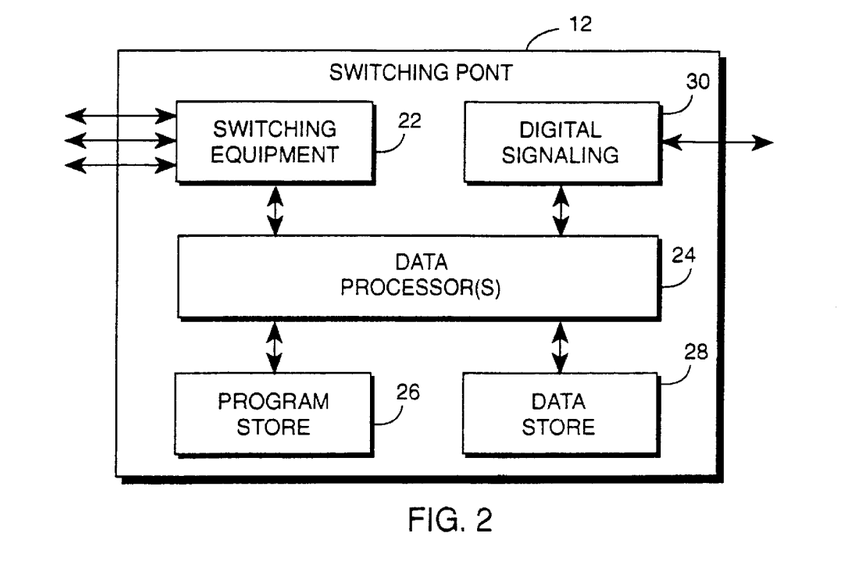
FIG. 2 is a function block diagram illustrating some of the hardware components used to implement the functions performed in the switching point shown in FIG. 1.

FIG. 2 shows in simplified block diagram format various hardware elements used to implement various functions of switching point 12. Switching point 12 includes switching equipment 22 with appropriate switching circuitry and trunk/line interfaces. The switching equipment and a digital signaling block 30 are controlled by one or more data processor(s) 24. Data processor 24 is connected to program store 26 (switching point 12 is a stored program control switch), and program store 26 and data store 28 interface with the data processor(s) 24 via well known address data and control bus lines. Program store 26 stores data programs for carrying out (along with many other functions) switching, signaling, analysis, supervision, and dynamic distribution functions. Data store 28 stores various data including for example data records updated by traffic reports from the incoming and outgoing traffic controllers 16 and 18, the traffic distribution frame messages forwarded to router 18, the traffic distribution frames themselves, etc. Data processor 24 controls the switching equipment 22 to make all of the switching connections between various incoming and outgoing trunks/lines and further generates/responds to digital control signaling to coordinate switching point communications with other elements in the telecommunications network.

One preferred example of a network switching point is the AXE exchange designed and manufactured by Ericsson, the assignee of the present invention. The AXE system is a stored program controlled switching system, and AXE generally consists of switching facilities for switching telephone calls (sometimes referred to as APT), and computer facilities used for controlling the switching (sometimes referred to as APZ). More generally, APT can be seen as the telephony part of AXE, and APZ can be seen as the control part. Both APT and APZ include hardware and software. In this example embodiment, the present invention may be implemented in the APT. The APT is divided into a number of functionally related subsystems including a traffic control subsystem, a trunk and signaling subsystem, a group switching subsystem, operation and maintenance subsystem, subscriber switching subsystem, charging subsystem, a subscriber services subsystem, an operator subsystem, a common channel signaling subsystem, a mobile telephony subsystem, and a network management system.

Figure 3:
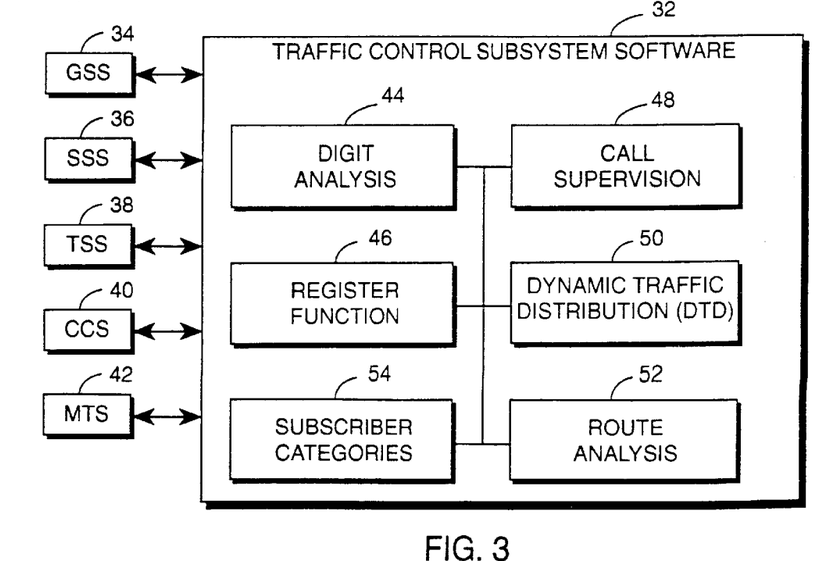
FIG. 3 illustrates certain specific software functions in a further detailed example embodiment of the present invention using an Ericsson AXE type exchange.

FIG. 3 shows a number of these APT subsystems. In particular, the present invention may be implemented as a function of the traffic control subsystem (TCS) software 32. Note that the traffic control subsystem software 32 interfaces and/or cooperates with other APT subsystems some of which are shown in FIG. 3: the group switching subsystem (GSS) 34, the subscriber switching subsystem (SSS) 36, the trunk and signaling subsystem (TSS) 38, the common channel signaling subsystem (CCSS) 40, the mobile telephony subsystem (MPS) 42, etc. In general, the TCS 32 is a central subsystem of APT and at a very high level can be thought of as replacing a human operator in a manual telephone switching system.

Examples of the traffic control subsystem functions include for example setup, supervision, and disconnection of calls; selection of outgoing routes; analysis of incoming digits; storage of subscriber categories, etc. FIG. 3 illustrates several of these TCS functions as software function blocks. The register function software block 46 stores incoming digits from incoming calls and handles call setup. Call supervision block 48 supervises calls in progress and "disconnects" them. Digit analysis software block 44 performs various incoming digit analyses in response to commands from route analysis software 52. The route analysis software block contains various tables and algorithms for selecting outgoing traffic routes including alternative traffic routes where such selection is usually ordered by the register function software block 46. The subscriber category software block 54 stores subscriber categories for all subscribers connected to the switching point. The dynamic traffic distribution functions in accordance with the present invention are implemented in the dynamic traffic distribution (DTD) software block 50. Because the architecture and operation of the AXE switched system are well-established, the following description focuses on the dynamic traffic distribution software block 50.

The dynamic traffic distribution software 50 avoids the problem of unnecessary payments between different network operators resulting from unfair traffic distributions at a switching point by balancing the traffic distributed among incoming and outgoing routes corresponding to different network operators, the route bundles, etc. The outgoing traffic from the switching point carried on a particular route bundle is determined based on dynamically determined amounts of incoming traffic on a corresponding incoming route bundle. This dynamic allocation of traffic may be based on percentages of traffic being carried by corresponding incoming and outgoing route bundles during a specified period of time rather than absolute traffic volumes. As mentioned above, the percentages may be based on call duration measurements for each call on the associated incoming and outgoing route bundles. The determined incoming and outgoing percentages for the corresponding incoming and outgoing route bundles are compared, and appropriate routing changes are made to equitably distribute the traffic.

Measurement of the duration of each call routed through the switching point may be implemented in the call supervision software block 48 of the traffic control subsystem software 32. After each call disconnect, call duration measurement data is sent to the dynamic traffic distribution software 50 which stores that information thereby updating previous measurements for various routes of each route bundle. At specified time intervals or after a specified number of call disconnects, the percentage load for each route bundle is calculated based on these call duration measurements by dividing traffic measured on one of the route bundles by the measured total amount. If the calculated percentage values for the outgoing route bundles differ from the corresponding incoming route bundles, new routing distribution data are sent to the route analysis software 52 for routing adjustments. Accordingly, the dynamic traffic distribution software 50 orders the addition to or removal of incoming or outgoing routes to a specific route bundle as necessary to balance the traffic distribution.

One specific example of how the dynamic traffic distribution (DTD) software 50 calculates the percentage of traffic load and distribution data for route bundles is now described. At an appropriate time, the DTD 50 scans through database records stored in data store 28 for each route bundle where the currently accumulated call duration time values for each route are stored. A one hundred call counter, for example, may be checked before the current amount of traffic on the incoming and outgoing route bundles are calculated. This counter ensures that redistribution of traffic on outgoing route bundles is not performed too frequently to avoid unnecessary and oscillating traffic distribution connections. Of course, other timing techniques and/or triggering events may be used to control when traffic distribution calculations are made.

The traffic percentage for each incoming route bundle is first calculated. The calculation is based on call duration measurements for all of the incoming traffic routes during the current measurement period. The calculated traffic percentage values for each incoming route bundle are later used as the "expected percentage" when traffic distribution data for corresponding outgoing route bundles are calculated. The example calculation includes equation (1) set forth below:

$$in(T_n)=mt(T_n)/Tot(T_n)*100 \quad (1)$$

where:

$T_n$=time period "n";

$in(T_n)$=traffic percentage for a specific incoming route bundle during time period "n";

$mt(T_n)$=total measured call duration time during time period "n" for the specific incoming route bundle; and $tot(T_n)$=total measured call duration time during time period "n" for all incoming route bundles.

Similarly, new distribution data for each associated or corresponding outgoing route bundle are calculated. The measured total traffic time, i.e., call duration time, for each route is compared with the expected time for that route bundle, and a difference or "delta time" is calculated. The delta time (dt) indicates whether a specific route bundle has received more or less traffic than expected during the previous time period. The delta time is used in setting distribution data used during the next time period. The delta time is calculated according to the following:

$$dt(T_n)=mt(T_n)-tot(T_n)*ex/100 \quad (2)$$

$$dt(all)=dt(T_n)+dt(all) \quad (3)$$

where $T_n$=time period "n";

$mt(T_n)$=total measured call duration time during time period "n" for a specific outgoing route bundle;

$dt(T_n)$=delta time during time period "n" for the specific outgoing route bundle;

$dt(all)$=delta time during all previous periods, i.e., ($T_n$, $T_{n-1}$ ... $T_0$) for the specific outgoing route bundle;

ex=this is an expected percentage previously specified; and $tot(T_n)$=total measured time during time period "n" for all route bundles.

If the time difference (dt) indicates that the traffic on a certain route bundle deviates from the expected value, the percentage distribution for the next time period is changed according to the following:

$$dist(T_{n+1})=ex-dt(all)/tot(T_n)*100 \quad (4)$$

where $dist(T_{n+1})$=distribution percentage that will be used during next time period, i.e., period $T_{n+1}$.

The following Table 1 provides an example of the calculations using equations (1)–(4) for three route bundles having the following desired percentages, RB1=50%, RB2=25%, and RB3=25%.

TABLE 1

|  | Tn | | | Tn + 1 | | | Tn + 2 | | | Tn + 3 | | | Tn + 4 |
| --- | --- | --- | --- | --- | --- | --- | --- | --- | --- | --- | --- | --- | --- |
|  | dist | mt | dt | dist | mt | dt | dist | mt | dt | dist | mt | dt | dist |
| RB1 | 50 | 100 | 0 | 50 | 60 | +10 | 40 | 90 | 0 | 50 | 150 | 0 | 50 |
| RB2 | 25 | 50 | 0 | 25 | 20 | −5 | 30 | 59 | +4 | 23 | 75 | +4 | 24 |
| RB3 | 25 | 50 | 0 | 25 | 20 | −5 | 30 | 51 | −4 | 27 | 75 | −4 | 26 |
| tot | 100 | 200 | 0 | 100 | 100 | 0 | 100 | 200 | 0 | 100 | 300 | 0 | 100 |

Notice that as the measured outgoing traffic "mt" increases in time period $T_{n+1}$, for route bundle RB1, (i.e., 50→60), the delta (dt) moves from 0→10. As "mt" decreases for route bundle RB2 and route bundle RB3, (i.e., 25→20), and the deltas move from 0→−5. In the next calculation time period $T_{n+2}$, the new, correcting traffic distribution percentages "dist" are 40%, 30%, and 30% meaning that incoming traffic carried by route bundle RB1 is decreased by 10%, and incoming traffic carried by route bundles RB2 and RB3 is each increased by 5%. The calculation time period $T_{n+4}$ shows how the traffic is redistributed returning to nearly the same percentages as those in time period $T_n$, i.e., 50%, 24%, and 26%, for route bundles RB1, RB2, and RB3, respectively.

Returning from the Table 1 calculation example, the call supervision block 48 of the traffic control subsystem 32 sends call disconnect information to the dynamic traffic distribution (DTD) block 50 along with other information including the calling individual's identification number (e.g., this number may be the caller's telephone number), call duration time, and route bundle number for the incoming and outgoing route. The DTD block 50 updates the appropriate data records for each route bundles in the switching point.

Figure 4A:
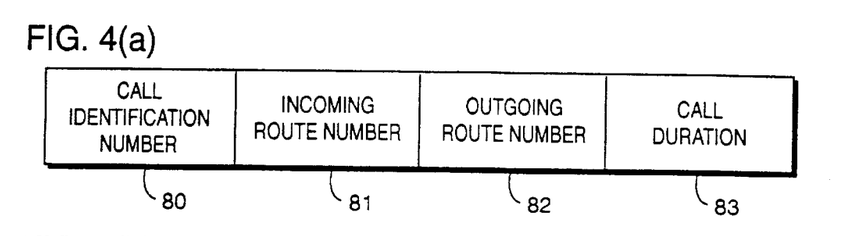
FIGS. 4(a)–4(b) are example data records employed in an example embodiment of the present invention.

The data structure containing the "report" information from the call supervision block 48 to the DTD block 50 for individual routes is shown in FIG. 4(*a*) and includes an call identification number field 80, an incoming route number field 81, an outgoing route number field 82, and a call duration field 83. In response to a request message from the DTD 50, traffic measurement and call identification information for each call routed through the node for a current measurement/calculation period is sent to DTD 50 from call supervision block 48. When a distribution calculation is to be made, the DTD 50 calculates the percentage of traffic handled by each of the incoming and outgoing route bundles and compares the traffic percentages for corresponding incoming/outgoing route bundles. The route analysis block 52 is informed as to whether the traffic load of the associated outgoing route bundle should be increased or decreased in order to match the corresponding incoming route bundle load.

Figure 4B:
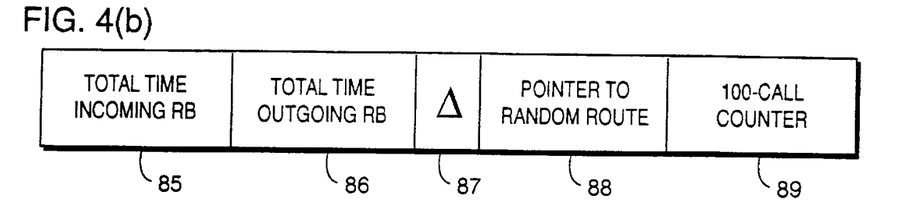

FIG. 4(*b*) shows an example route bundle record. Fields 85 and 86 specify a total measured time per corresponding incoming and outgoing route bundles, respectively. Field 87 records the difference or delta "Δ" in time between the incoming and outgoing measured times for that route bundle. Field 88 is a pointer to a random record in the route analysis software block used to select route bundles (described in more detail below). Field 89 is a 100 call-counter used to keep track of the number of calls over routes in this particular bundle so that when 100 calls are reached, analysis of the traffic distribution can be made.

Figure 5:
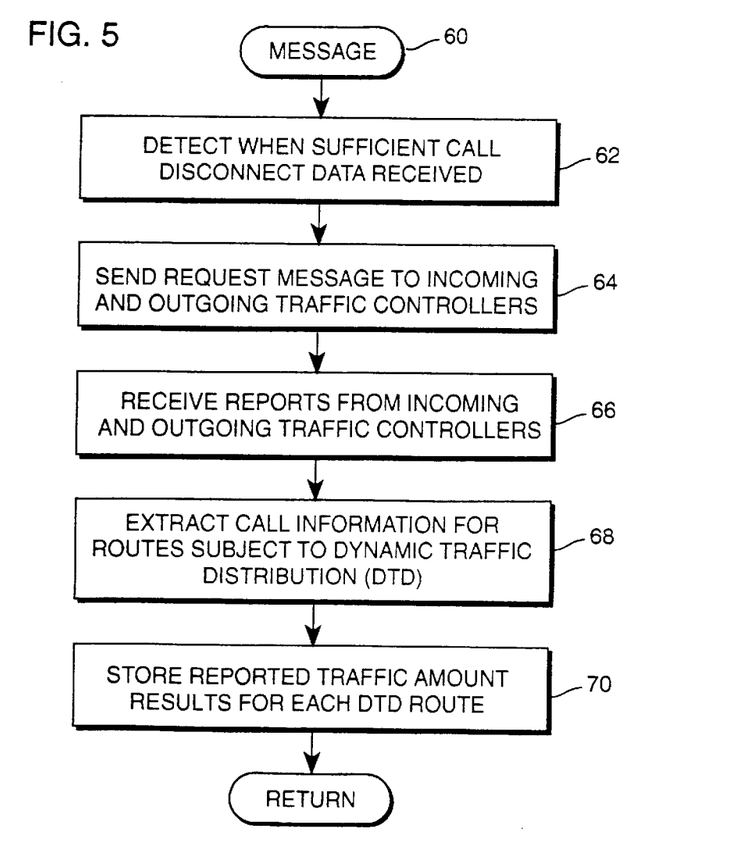
FIG. 5 is a flowchart diagram illustrating messaging procedures performed by the traffic analyzer to determine the amount of traffic for various routes in the switching point.

Returning to the example embodiment of FIG. 1, FIG. 5 is a flowchart diagram illustrating example steps carried out by traffic analyzer 14. Message routine 60 relates to generating the call report and request messages that are transmitted between the incoming and outgoing traffic controllers 16 and 20 and the traffic analyzer 14. When the incoming or outgoing traffic controllers 16 or 20 detect that sufficient traffic has been received over a particular route bundle to warrant a traffic distribution determination (block 62), e.g., a route bundle's call counter has reached 100 calls or a particular time period has expired since the last calculation, the traffic analyzer 14 sends a request message to both incoming and outgoing traffic controllers 16 and 20 requesting report information regarding the current call distribution measurements for each route bundle (block 64). The incoming and outgoing traffic controllers 16 and 20 send report messages including for each call, the call's identification number, the specific incoming route number, outgoing route number, and call duration (block 66). Traffic analyzer 14 collects call information from these reports for those routes in switching point 12 that are subject to dynamic traffic distribution balancing (block 68). This received call information from the incoming and outgoing traffic controller reports is stored for each DTD route bundle in a data record like the sample record in FIG. 4(*a*) (block 70).

Figure 6:
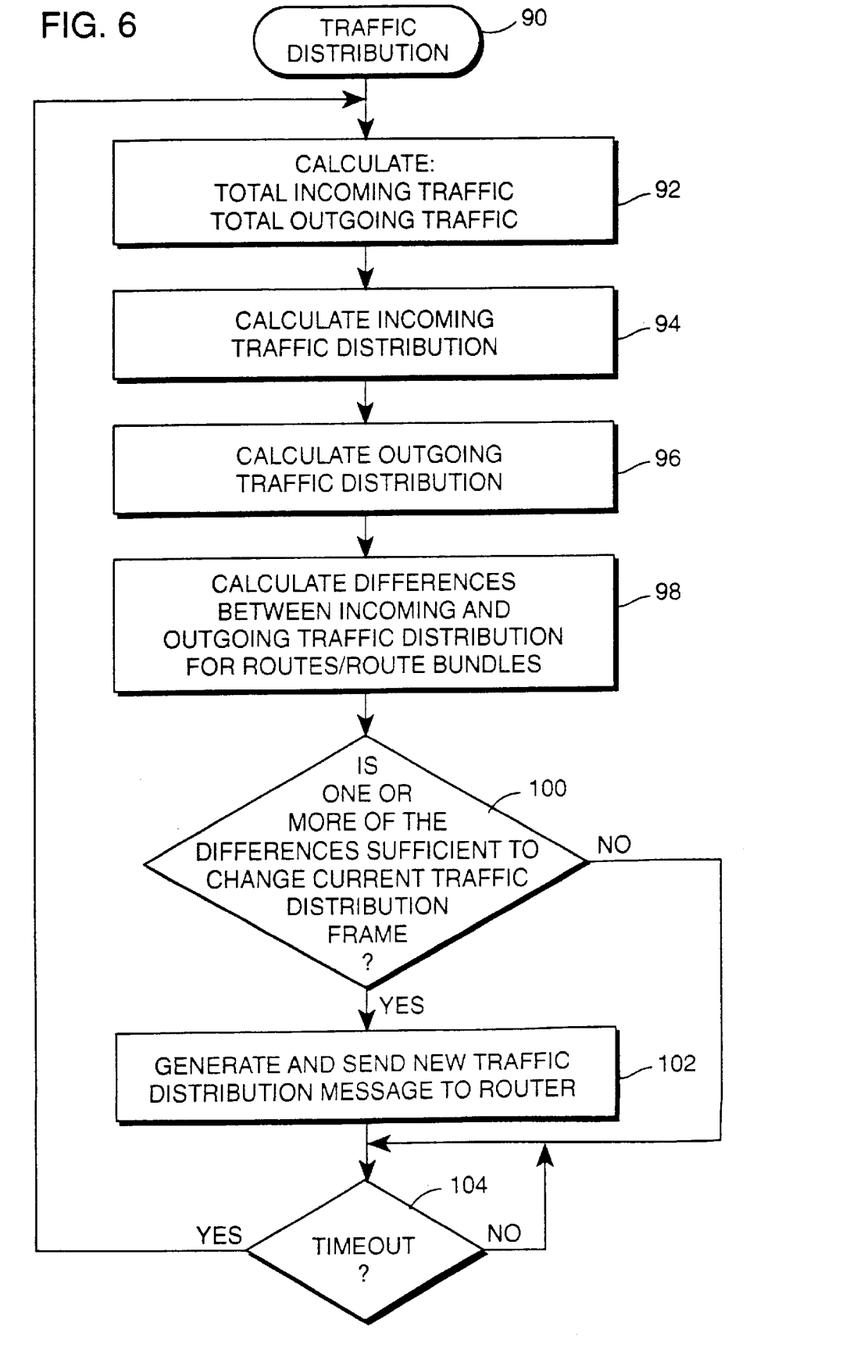
FIG. 6 is a flowchart diagram of example procedures performed by the traffic analyzer to determine if traffic redistribution is necessary in a switching point, and if so, to generate a new traffic distribution frame.

Reference is now made to the traffic distribution routine 90 depicted in flowchart format in FIG. 6. The traffic analyzer 14 periodically, (e.g., when 100 calls have been received on a particular route bundle or a particular time period has expired), calculates the total incoming traffic and total outgoing traffic amounts, e.g., in units of call minutes and seconds, for each route bundle in the switching point (block 92). These calculations are made using the current call duration information from call records like that shown in FIG. 4(*a*) maintained for each route in memory. Incoming and outgoing traffic distribution percentages for each route bundle are then calculated in blocks 94 and 96 by dividing the total call duration time for a particular route bundle by the total traffic time. The traffic analyzer 14 then calculates the difference between incoming and outgoing traffic distribution percentages for an individual route bundle (block 98). That calculated difference is loaded into the delta field 87 of the example data record shown in FIG. 4(*b*). A decision is made in block 100 whether one or more of the call duration percentage differences between an incoming route bundle and a corresponding outgoing route bundle is sufficiently large (exceeds a deadband or other threshold) to warrant changing the current traffic distribution. If not, control proceeds to time-out decision block 104. If so, control proceeds to block 102 where the traffic analyzer generates and sends a new traffic distribution message to the router 18 for use in dynamically redistributing the traffic over the routes of the various outgoing route bundles.

Figure 7:
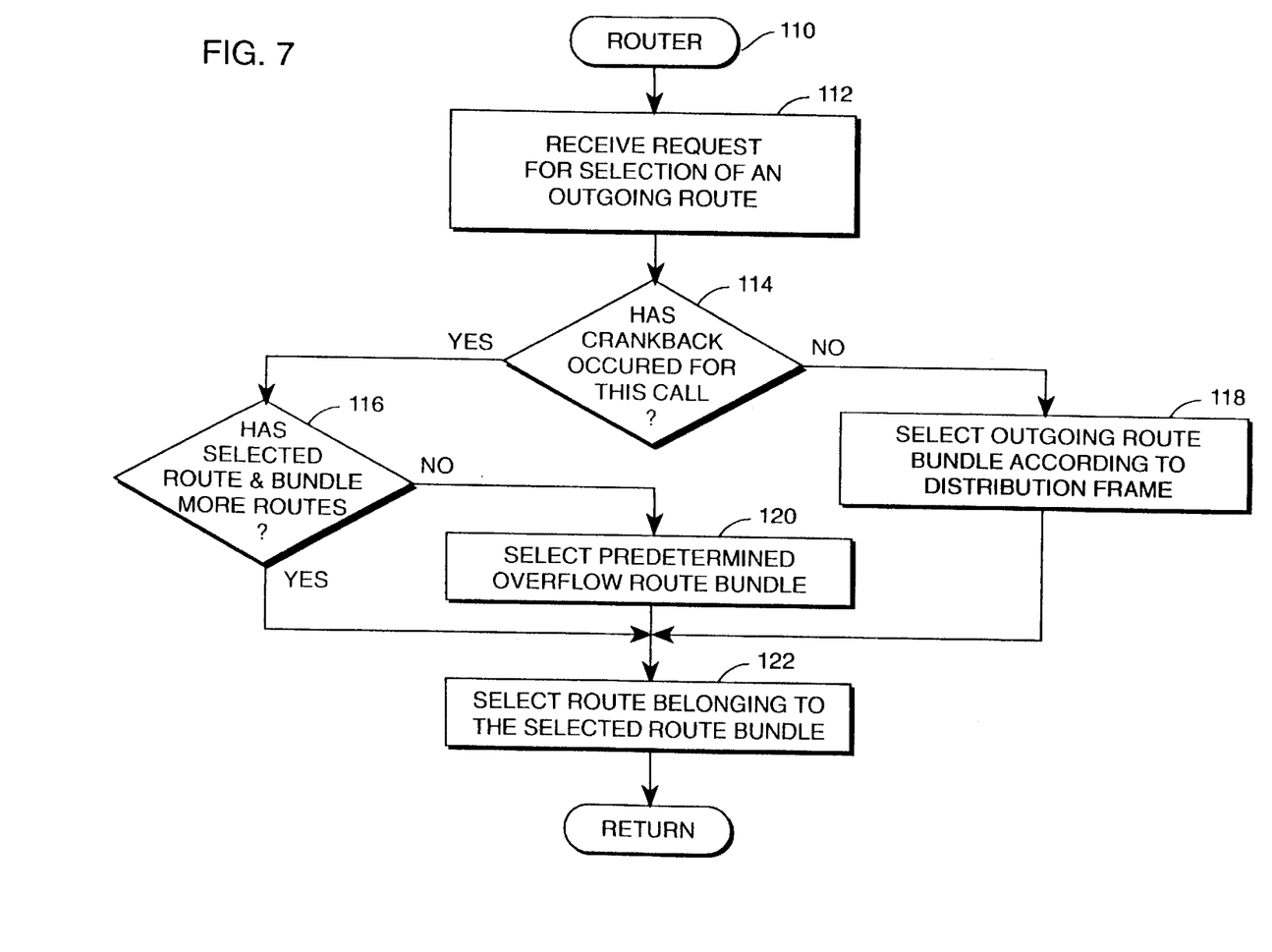
FIG. 7 is a flowchart diagram illustrating procedures performed by the router in FIG. 1 selecting carriers/route bundle routes supported by the switching point.

A router routine 110 is illustrated in flowchart format in FIG. 7. Router 18 selects optimum routing patterns as is well known on the basis of actual occupancy levels of circuit groups and exchanges in the network. The following basic fundamental routing principles may be employed such as avoiding occupied circuit groups, not using overloaded exchanges for transit, restricting routing of direct connections in overload circumstances, etc. Beginning in block 112, the router 18 receives the request for selection of an outgoing route in response to an initial call setup that involves switching point 12 to connect the call to its destination. A decision is made in block 114 whether "crankback" has occurred from this call. Crankback, as described above, refers to the situation in the initial call setup phase where an upstream exchange receives a signal from a downstream exchange indicating that because of congestion, the call will be blocked, and therefore, the call must be rerouted at the upstream exchange. If crankback has not occurred for this particular call, the router 18 selects an outgoing route bundle in accordance with the current traffic distribution frame (block 118). An example of a traffic distribution frame is shown for example in FIG. 8 described in more detail below. A preferred example of outgoing carrier/route bundle selection is performed in accordance with established random selection principles. Remote bundles are selected according to specified percentages in random fashion. The router 18 selects one of several routes belonging to the selected route bundle (block 122).

If crankback has occurred for this call, a decision is made in block 116 whether the route bundle selected in block 118 has any other routes that may be selected. If so, another such route belonging to that selected route bundle is selected in block 122. Otherwise, the router selects a predetermined overflow route bundle as indicated in block 120.

Figure 8:
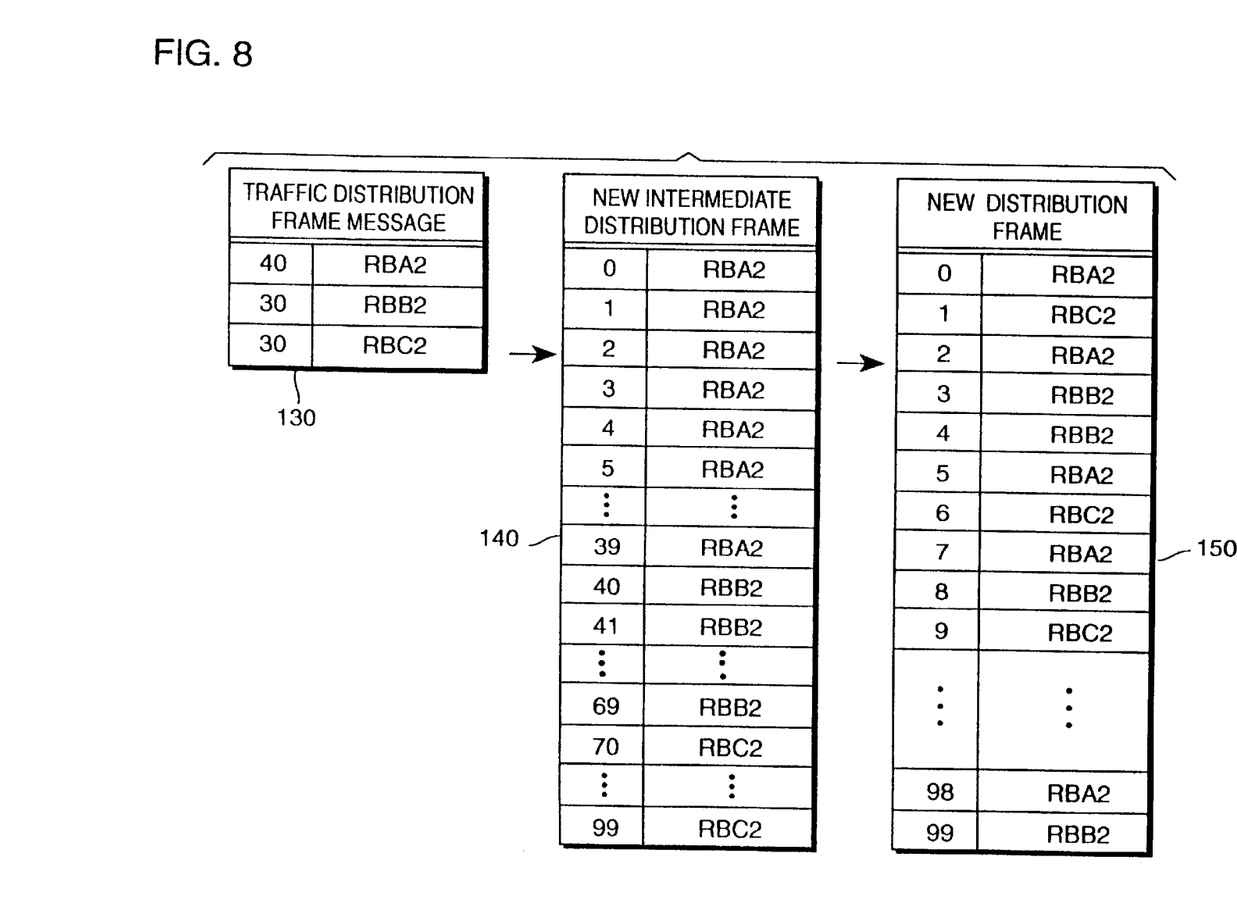
FIG. 8 shows an example of how a new distribution frame is created by the router from a new traffic distribution frame message.

FIG. 8 illustrates a traffic distribution frame message 130 which requests a change in traffic distribution of outgoing route bundles RBA2, RBB2, and RBC2 from a current traffic distribution of 50%, 25%, and 25% to 40%, 30%, and 30%, respectively. Accordingly, the new intermediate distribution frame 140 generated by router 18 would include for the next 100 calls, 40 calls (positions 0–39) allocated to outgoing route bundle RBA2, 30 calls (positions 40–69) allocated to outgoing route bundle RBB2 routes, and 30 calls (positions 70–99) allocated to outgoing route bundle RBC2 routes. The intermediate distribution frame 140 is randomized so that the routes 0–99 are selected randomly in the new distribution frame 150 in accordance with the random route selection procedures briefly described above.

Dynamic traffic distribution provided by the present invention at individual switching points allows calls to be immediately redistributed with great flexibility and at low cost. One example advantage is that call carriers can be allocated their fair share of outgoing traffic to accurately reflect their incoming traffic contribution to the switching point. Of course those skilled in the art will recognize that the present invention can be applied to dynamically distribute traffic allocation for route bundles and carriers based on one or more parameters other than "fair share." Another example application of the invention is to balancing traffic between switching points or other nodes. The present invention would prevent some routes from being heavily loaded with long duration calls, for example, with other routes carrying mainly short duration calls. Thus, a more general parameter than "fair share" might simply be "traffic balancing." While the description refers to route bundles and to carriers, the present invention may also be readily applied to individual incoming and associated outgoing routes. And of course, the dynamic distributed traffic in this invention includes both voice calls and data calls.

The foregoing is of course just an illustration of the principles of the present invention. It will thus be appreciated that those skilled in the art will be able to devise various arrangements which, although not explicitly described or shown herein, embody the principles of the invention and thus are within its spirit and scope as defined in the claims set forth below.

We claim:

1. A method for distributing telecommunications traffic at a telecommunications node among plural telecommunications routes, comprising the steps of:
    detecting a distribution of traffic for incoming routes to the node and for outgoing routes from the node based on a call duration determined for calls associated with each route, and
    automatically redistributing traffic among the outgoing routes using the determined call durations based on the distribution of traffic detected for the incoming routes.

2. The method in claim 1, further comprising:
    generating a data record stored in memory for each call routed through the telecommunications node that records the incoming route, the outgoing route, and the call duration.

3. The method in claim 1, wherein the detecting step includes detecting a current distribution of traffic after every predetermined number of calls for groups of incoming and outgoing routes, and the redistributing step includes redistributing traffic among two or more outgoing route groups based on the current distribution of traffic.

4. The method in claim 3, further comprising:
    generating a data record stored in memory for each route group in the telecommunications node that records an incoming total amount of incoming traffic based on a call duration for completed calls over a predetermined time period, an outgoing total amount of outgoing traffic based on a call duration for completed calls over the predetermined time period, and the difference between the incoming and outgoing total amounts of traffic.

5. A method for distributing telecommunications traffic at a telecommunications node among plural telecommunication routes, comprising the steps of:
    detecting a distribution of traffic for incoming routes to the node and for outgoing routes from the node including detecting a current distribution of traffic for groups of incoming and outgoing routes;
    automatically redistributing traffic among the outgoing routes based on the distribution detected for incoming routes including redistributing traffic among two or more outgoing route groups based on the current distribution of traffic; and
    generating a data record stored in memory for each route group in the telecommunications node that records an incoming total amount of incoming traffic over a predetermined time period, an outgoing total amount of outgoing traffic over the predetermined time period, and the difference between the incoming and outgoing total amounts of traffic,
    wherein the amount of traffic is measured in terms of call time.

6. The method in claim 3, further comprising:
    determining for each route group in the telecommunications node an incoming total amount of incoming traffic over a predetermined time period and an outgoing total amount of outgoing traffic over the predetermined time period;
    calculating for each route group the difference in terms of call duration time between the incoming and outgoing total amounts of traffic.

7. A method for distributing telecommunications traffic at a telecommunications node among plural telecommunication routes, comprising the steps of:
    detecting a distribution of traffic for incoming routes to the node and for outgoing routes from the node including detecting a current distribution of traffic for groups of incoming and outgoing routes,
    automatically redistributing traffic among the outgoing routes based on the distribution detected for incoming routes including redistributing traffic among two or more outgoing route groups based on the current distribution of traffic;
    determining for each route group in the telecommunications node an incoming total amount of incoming traffic over a predetermined time period and an outgoing total amount of outgoing traffic over the predetermined time period;
    calculating for each route group the difference between the incoming and outgoing total amounts of traffic; and
    determining if the difference calculated for a route group is sufficient to justify a change in the current outgoing traffic distribution.

8. The method in claim 7, wherein the redistributing step further comprises:
    generating a new outgoing traffic distribution allocation for at least two of the route groups to offset at least one route group difference.

9. A method for distributing communications traffic at a telecommunications switching point in a communications network supporting plural network operators at the switching point, each network operator having a corresponding carrier for carrying incoming traffic into the switching point and for carrying outgoing traffic away from the switching point, comprising:
    detecting an amount of incoming traffic to the switching point for each network operator based on one or more call duration measurements and an amount of outgoing traffic from the node for each network operator based on one or more call duration measurements;
    comparing the detected amount of incoming traffic with the detected amount of outgoing traffic for each network operator at the switching point; and
    rerouting traffic among the outgoing carriers so that a distribution of outgoing traffic for one of the network operators is balanced in accordance with the distribution of incoming traffic for the one network operator.

10. The method in claim 9, wherein the amount of incoming and outgoing traffic is measured in terms of percentage of total incoming and outgoing calls per unit time, respectively.

11. The method in claim 9, wherein each carrier includes one or more route bundles, the method further comprising:

calculating a traffic percentage for each route bundle in accordance with the following:

$$in(T_n)=mt(Tn)/Tot(T_n)*100 \quad (1)$$

where:

$T_n$=time period "n";

$in(T_n)$=traffic percentage for a specific incoming route bundle during time period "n";

$mt(T_n)$=total measured call duration time during time period "n" for the specific incoming route bundle; and $tot(T_n)$=total measured call duration time during the time period "n" for all incoming route bundles.

12. The method in claim 9, wherein the traffic is rerouted so that an amount of traffic on each outgoing carrier substantially matches an amount of traffic on a corresponding incoming carrier.

13. A dynamic traffic distribution system for distributing communications traffic between plural communication routes through a switching point, comprising:

a traffic controller detecting an amount of traffic measured in terms of time coming into the switching point on each route and an amount of traffic measured in terms of time leaving the switching point on each route;

a traffic analyzer receiving from the traffic controller the amount of traffic based on the detected time measurements coming into the switching point and determining a new traffic distribution for the switching point; and a traffic router receiving from the traffic analyzer a message representing the new traffic distribution and changing the amount of outgoing traffic distributed to each outgoing route.

14. The dynamic traffic distribution system according to claim 13, wherein the new traffic distribution is based on the amount of traffic coming into the switching point on each route measured in terms of call duration time and the amount of traffic leaving the switching point on each route measured in terms of call duration time.

15. The dynamic traffic distribution system according to claim 13, wherein the traffic analyzer balances the traffic so that one or more outgoing routes are allocated a fair share of traffic based on the amount of incoming traffic on corresponding one or more incoming routes measured in terms of call duration time.

16. The dynamic traffic distribution system according to claim 13, wherein the traffic analyzer balances the traffic so that one or more outgoing routes are allocated about the same amount of traffic on corresponding one or more incoming routes measured in terms of call duration time.

17. The dynamic traffic distribution system according to claim 13, wherein in response to a request for selection of an outgoing route, the router selects an outgoing route according to the received new traffic distribution message.

18. The dynamic traffic distribution system according to claim 13, wherein the traffic analyzer sends the new traffic distribution message to the router to change the outgoing traffic distribution among the outgoing routes when a disparity between the amount of incoming traffic on an incoming route measured in terms of call duration time and the amount of outgoing traffic on corresponding outgoing route measured in terms of call duration time exceeds a threshold.

19. The dynamic traffic distribution system according to claim 18, wherein the traffic analyzer sends the new traffic distribution message to the router to change the outgoing traffic distribution among the outgoing routes when a predetermined number of calls has been analyzed or a predetermined times period has expired.

20. The dynamic traffic distribution system according to claim 13, wherein the amount of traffic is determined based on a number of established calls routed through the switching point that have been disconnected.

21. The dynamic traffic distribution system according to claim 13, wherein a plurality of carriers are associated with the switching point, each carrier having certain ones of the incoming and outgoing routes, and the traffic analyzer determines the new traffic distribution by allocating a number of outgoing routes to each carrier in accordance with the number of incoming routes currently associated with each carrier.

22. The dynamic traffic distribution system according to claim 21, wherein the traffic analyzer determines the new traffic distribution by allocating a percentage of outgoing routes to each carrier in accordance with a percentage of incoming routes associated with each carrier.

23. The dynamic traffic distribution system according to claim 13, wherein the traffic analyzer generates and stores a data record in memory for each an incoming total amount of incoming traffic measured in terms of time over a predetermined time period, an outgoing total amount of outgoing traffic measured in terms of time over the predetermined time period, and the difference between the incoming and outgoing total amounts of traffic measured in terms of time.

24. The dynamic traffic distribution system according to claim 13, wherein certain routes are grouped together and wherein the traffic analyzer determines for each route group an incoming total amount of incoming traffic measured in terms of time over a predetermined time period and an outgoing total amount of outgoing traffic measured in terms of time over the predetermined time period, and calculates for each route group the difference between the incoming and outgoing total amounts of traffic measured in terms of time.

25. The dynamic traffic distribution system according to claim 24, wherein the traffic analyzer determines if the difference calculated for a route group is sufficient to justify a change in the current outgoing traffic distribution.

26. The dynamic traffic distribution system according to claim 25, wherein the traffic analyzer generates a new outgoing traffic distribution allocation for at least two of the route groups to offset at least one route group difference.

27. The dynamic traffic distribution system according to claim 13, wherein the traffic analyzer calculates a traffic percentage for individual bundles of routes in accordance with the following:

$$in(Tn)=mt(Tn)/Tot(T_n)*100 \quad (1)$$

where:

$T_n$=time period "n";

$in(T_n)$=traffic percentage for a specific incoming route bundle during time period "n";

$mt(T_n)$=total measured call duration time during time period "n" for the specific incoming route bundle; and $tot(T_n)$=total measured call duration time during the time period "n" for all incoming route bundles.

* * * * *